United States Patent
Sammons et al.

(10) Patent No.: US 9,102,347 B2
(45) Date of Patent: Aug. 11, 2015

(54) SYSTEM AND METHOD FOR MODULAR TRANSPORTATION OF A WELDING SYSTEM

(71) Applicant: Illinois Tool Works Inc., Glenview, IL (US)

(72) Inventors: Michael Allen Sammons, Appleton, WI (US); Pravin Prabhakarrao Sontakke, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 232 days.

(21) Appl. No.: 13/840,174

(22) Filed: Mar. 15, 2013

(65) Prior Publication Data

US 2014/0070506 A1    Mar. 13, 2014

Related U.S. Application Data

(60) Provisional application No. 61/698,035, filed on Sep. 7, 2012.

(51) Int. Cl.
*B62B 3/02* (2006.01)
*B62B 3/10* (2006.01)
*B23P 19/00* (2006.01)

(52) U.S. Cl.
CPC . *B62B 3/10* (2013.01); *B23P 19/00* (2013.01); *B62B 3/02* (2013.01); *B62B 2202/022* (2013.01); *B62B 2202/48* (2013.01); *B62B 2205/006* (2013.01); *B62B 2206/02* (2013.01); *Y10T 29/49826* (2013.01)

(58) Field of Classification Search
CPC .... B62B 2206/02; B62B 5/0083; B62B 3/02; B62B 3/10; B60B 33/0002; B60B 33/0039; B23P 19/00
USPC ......... 280/638, 35, 47.34, 47.35, 79.11, 79.3, 280/79.6, 79.7
See application file for complete search history.

(56) References Cited

U.S. PATENT DOCUMENTS 4,302,023 A * 11/1981 Kiesz ......................... 280/43.24
5,012,879 A * 5/1991 Bienek et al. ................ 180/6.48
5,249,823 A * 10/1993 McCoy et al. ................ 280/656

(Continued)

FOREIGN PATENT DOCUMENTS

DE    29713717    10/1997

OTHER PUBLICATIONS

International Search Report from PCT application No. PCT/US2013/058345 dated Dec. 17, 2013, 11 pgs.

*Primary Examiner* — Brodie Follman
(74) *Attorney, Agent, or Firm* — Fletcher Yoder P.C.

(57) ABSTRACT

Present embodiments include a modular welding component transportation system. The system includes a front panel and a wheel assembly. The front panel includes a support platform configured to support a welding system component and the wheel assembly includes a first plurality of wheels. The system also includes a rail configured to adjustably couple with the front panel proximate a first end of the rail and configured to couple with the wheel assembly proximate a second end of the rail. Locating surfaces of the wheel assembly are configured to receive and align the rail for engagement with walls of the wheel assembly. The system further includes a second plurality of wheels configured to be coupled with the front panel or proximate the first end of the rail.

20 Claims, 6 Drawing Sheets

(56) References Cited

U.S. PATENT DOCUMENTS

| | | | |
|---|---|---|---|
| 5,299,817 A * | 4/1994 | Chang | 280/35 |
| 5,328,192 A * | 7/1994 | Thompson | 280/47.24 |
| 5,440,098 A * | 8/1995 | Matus | 219/136 |
| 5,730,891 A * | 3/1998 | Karpoff et al. | 219/136 |
| 5,779,252 A * | 7/1998 | Bolton, Jr. | 280/47.371 |
| 5,816,604 A * | 10/1998 | Hsieh et al. | 280/655.1 |
| 6,079,941 A * | 6/2000 | Lee | 414/812 |
| 6,223,908 B1 * | 5/2001 | Kurtsman | 211/26 |
| 6,590,184 B1 * | 7/2003 | Andersen | 219/136 |
| 6,596,972 B1 * | 7/2003 | Di Novo et al. | 219/137.9 |
| 6,930,282 B1 * | 8/2005 | Di Novo et al. | 219/137.9 |
| 6,992,266 B1 * | 1/2006 | Di Novo et al. | 219/137.9 |
| 7,241,973 B1 * | 7/2007 | Di Novo et al. | 219/137.9 |
| 7,252,297 B1 * | 8/2007 | Barritt et al. | 280/47.26 |
| 7,357,398 B2 * | 4/2008 | O'Connor | 280/47.34 |
| 7,762,566 B2 * | 7/2010 | Wang | 280/79.7 |
| 8,336,719 B2 * | 12/2012 | Fan | 211/26 |
| 8,474,835 B1 * | 7/2013 | Rossi | 280/47.35 |
| 8,569,654 B2 * | 10/2013 | Granato et al. | 219/137.7 |
| 8,616,564 B2 * | 12/2013 | Takehara et al. | 280/79.11 |
| 8,748,777 B2 * | 6/2014 | Ertmer et al. | 219/136 |
| 8,944,442 B2 * | 2/2015 | Tsai | 280/35 |
| 2002/0027114 A1 * | 3/2002 | Krusell | 211/85.7 |
| 2006/0119059 A1 * | 6/2006 | O'Connor | 280/47.35 |
| 2007/0039129 A1 | 2/2007 | Dahl | |
| 2007/0235968 A1 * | 10/2007 | Krizan et al. | 280/79.7 |
| 2013/0154216 A1 * | 6/2013 | Paulk et al. | 280/79.11 |
| 2014/0070506 A1 * | 3/2014 | Sammons et al. | 280/79.11 |
| 2014/0103615 A1 * | 4/2014 | Tsai | 280/35 |

* cited by examiner

SYSTEM AND METHOD FOR MODULAR TRANSPORTATION OF A WELDING SYSTEM

CROSS-REFERENCE TO RELATED APPLICATION

This application claims priority from and the benefit of U.S. Provisional Application Ser. No. 61/698,035, entitled "MODULAR TRANSPORTATION DEVICE FOR A WELDING SYSTEM," filed Sep. 7, 2012, which is hereby incorporated by reference in its entirety for all purposes.

BACKGROUND

The present disclosure relates generally to the field of welding systems, and more particularly to a welding system transportation device.

Transportation devices (e.g., carts, dollies, running gear) for welding systems are generally assembled in a factory setting and subsequently delivered to the purchaser. The assembly process generally includes welding the components of the transportation device together, resulting in a bulky and often heavy final product that cannot be changed by the purchaser or end-user. This traditional assembly sequence generally results in costly shipping fees for shipping the transportation device and does not enable the purchaser or end-user to customize the transportation device to fit their needs.

The embodiments described herein include improvements to welding system transportation devices. Such improvements may enable on-site assembly and customization of the transportation device by the purchaser or end-user and reduced shipping and/or assembly costs for the manufacturer.

BRIEF DESCRIPTION

The present disclosure is directed to a modular welding component transportation system. The system includes modular components that can be provided separately and assembled by a purchaser or end-user. The system includes a front panel, a wheel assembly, and one or more rails. The front panel and wheel assembly are designed to be coupled together by the rail or plurality of rails. The front panel includes a support platform designed to support a welding system component and the wheel assembly includes a plurality of wheels. The front panel may also comprise alignment features configured to facilitate alignment of the welding system component with the support platform by engaging with a base of the welding system component. The wheel assembly may also include a cylinder pan assembly with a planar support for a gas cylinder bottle. The rail (or plurality of rails) of the system is configured to adjustably couple with the front panel proximate a first end of the rail and configured to couple with the wheel assembly proximate a second end of the rail. With regard to adjustable characteristics of the system, the rail may include a plurality of rail engagement features (e.g., holes or extensions) in different locations along a length of the rail and proximate a distal end of the rail, each of the plurality of rail engagement features configured to align with an engagement feature of the front panel to facilitate coupling the rail with the front panel in different configurations. The wheel assembly may include locating surfaces configured to receive and align the rail or rails for engagement with walls of the wheel assembly. The system may also include an additional plurality of wheels configured to be coupled (e.g., via a wheel support) with the front panel or proximate the first end of the rail.

DETAILED DESCRIPTION

The present disclosure is directed to a modular transportation device or running gear that may be particularly well suited for transporting welding systems and/or welding system accessories. As such, the transportation device may include a platform to accommodate a power source or other component (e.g., a cooler) of a welding system. The platform may be formed from a front panel and one or more rails such that a length of the platform may be adjustable into different configurations to enable the transportation device to accommodate multiple welding system component sizes (e.g. power supply sizes). The one or more rails of the system may each include between approximately 2 and 10 sets of holes (or other coupling features) that facilitate coupling with the front panel, a wheel assembly (including rear wheels), front wheels, or a combination thereof, with respect to the rail or rails. Indeed, one or more of each of the front panel, the wheel assembly, and the front wheels may be independently translatable with respect to the one or more rails. Therefore, the rail or rails may enable a purchaser or end-user to customize the transportation device to suit their specific application or needs.

As noted above, the transportation device may include front and rear wheels, which enable the transportation device to be maneuvered by a user with ease from one place to another. The front and back wheels may include multiple wheels (e.g., casters). In one embodiment, the front wheels may include two casters that couple with the system via a wheel support and the rear wheels may include two wheels extending from axles of the wheel assembly. However, any number and/or type of wheels may be used. For example, between approximately 1 and 10 wheels may be included as components of the wheel assembly or as the front wheels. It should be noted that, in addition to the rear wheels, the wheel assembly may include a cylinder pan assembly to accommodate at least one gas cylinder bottle. The cylinder pan assembly may include a gas cylinder support formed from sheet metal and may include a strap (e.g., belt, chain, band) to secure the gas cylinder bottle to the transportation device.

Figure 1:
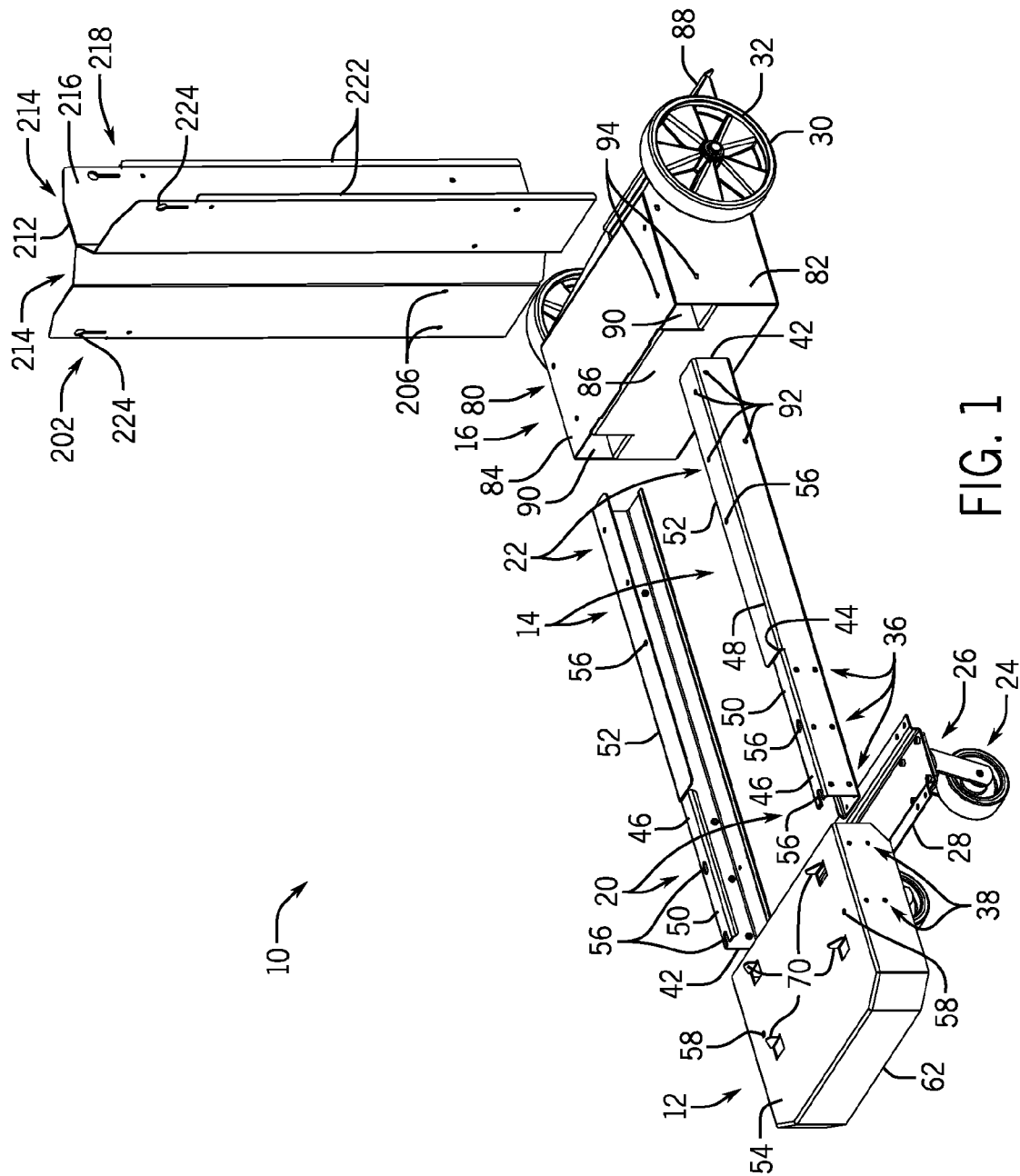
FIG. 1 is a perspective view of unassembled modular components of a transportation device in accordance with present embodiments

FIG. 1 is a perspective view of unassembled modular components of a transportation device in accordance with present embodiments. The group of modular components (whether assembled or unassembled) is cumulatively referred to as a transportation device or system 10 in the present disclosure. The system 10 includes a front panel 12, rails 14, and a wheel assembly 16. The use of the two rails 14 in the illustrate embodiment instead of a single large rail 14 may more efficiently utilize material and space. However, the system may include different configurations using a single rail 14 or multiple rails 14 in accordance with present embodiments. The front panel 12 is configured to adjustably couple with a front end 20 of the rails 14 and the wheel assembly 16 is configured to couple with a back end 22 of the rails 14. As will be discussed below, these modular components of the system 10 are configured to be coupled together to form a maneuverable device (i.e., the transportation device 10) for transportation of a welding system component. To facilitate maneuverability, the system 10 includes front wheels 24 (e.g., casters) that are configured to couple with the front panel 12, the rails 14, or both. In the illustrated embodiment, the front wheels 24 include casters that are part of a wheel pan assembly 26 including a wheel pan 28, and the front wheels couple with the rails 14 via the wheel pan 28. The system 10 also includes rear or back wheels 30 that extend from the wheel assembly 16 along corresponding axles 32. In some embodiments, the wheels 30 may extend from a common axle 32.

As set forth above, the front panel 12 and the rails 14 are configured to adjustably couple together. In the illustrated embodiment, this adjustability is provided by a plurality of rail engagement features 36 in different locations along lengths of the rails 14 and engagement features 38 of the front panel 12. Specifically, in the illustrated embodiment, the rail engagement features 36 and the engagement features 38 of the front panel 12 include openings through the respective components that allow a bolt (not shown) to pass through both openings and secure the components together. In other embodiments, different engagement features or fasteners may be utilized. Indeed, the engagement features may include fasteners such as bolts, screws, threaded openings, extensions, interlocks, snaps, latches, and so forth. Further, engagement features of the same size (e.g., same sized holes and bolts) may be utilized for essentially all component couplings to simplify the process of assembling and manufacturing the system 10.

Figure 2:
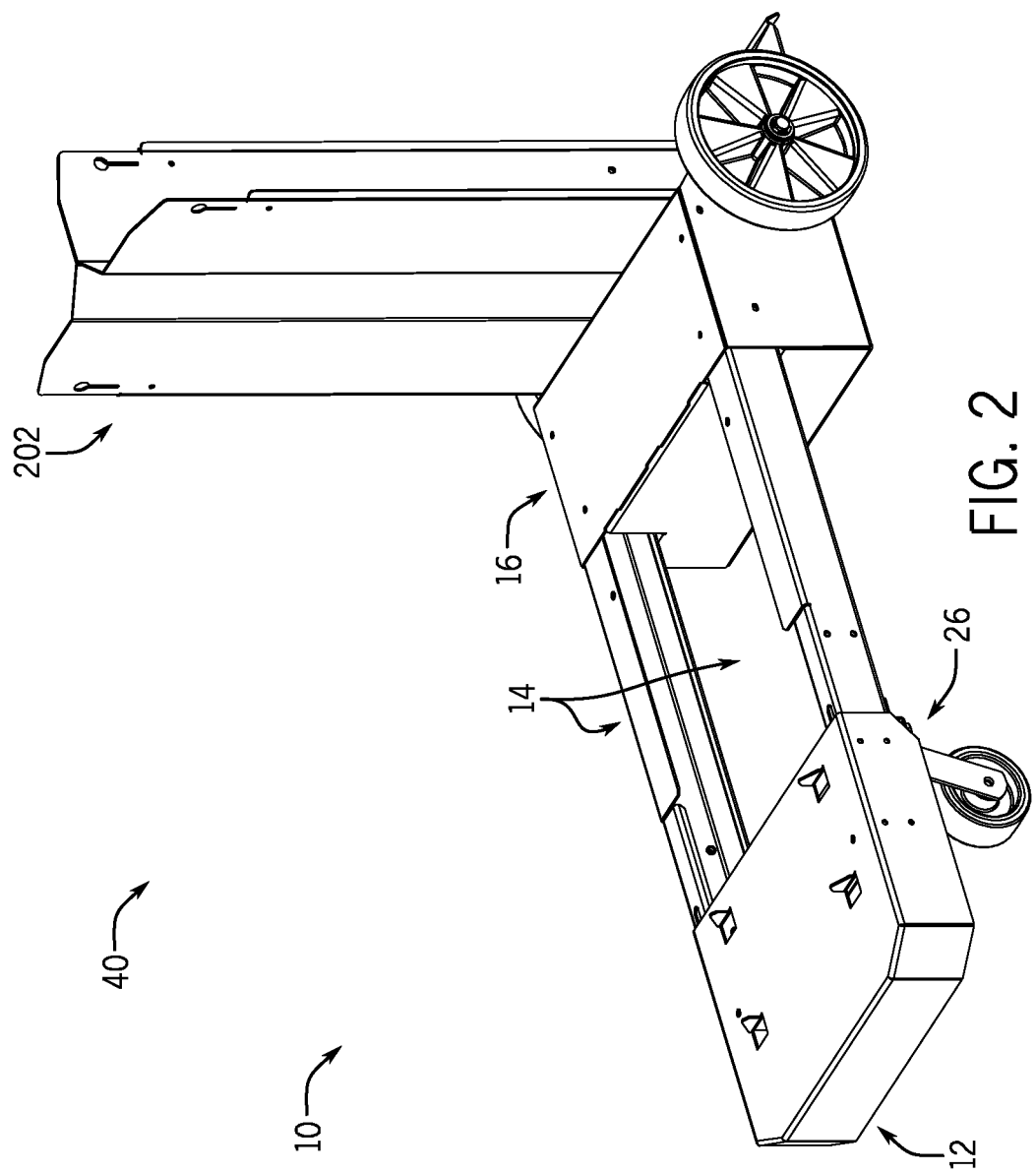
FIG. 2 is a perspective view of an assembled transportation device with adjustable features arranged into a compressed orientation in accordance with present embodiments.
Figure 3:
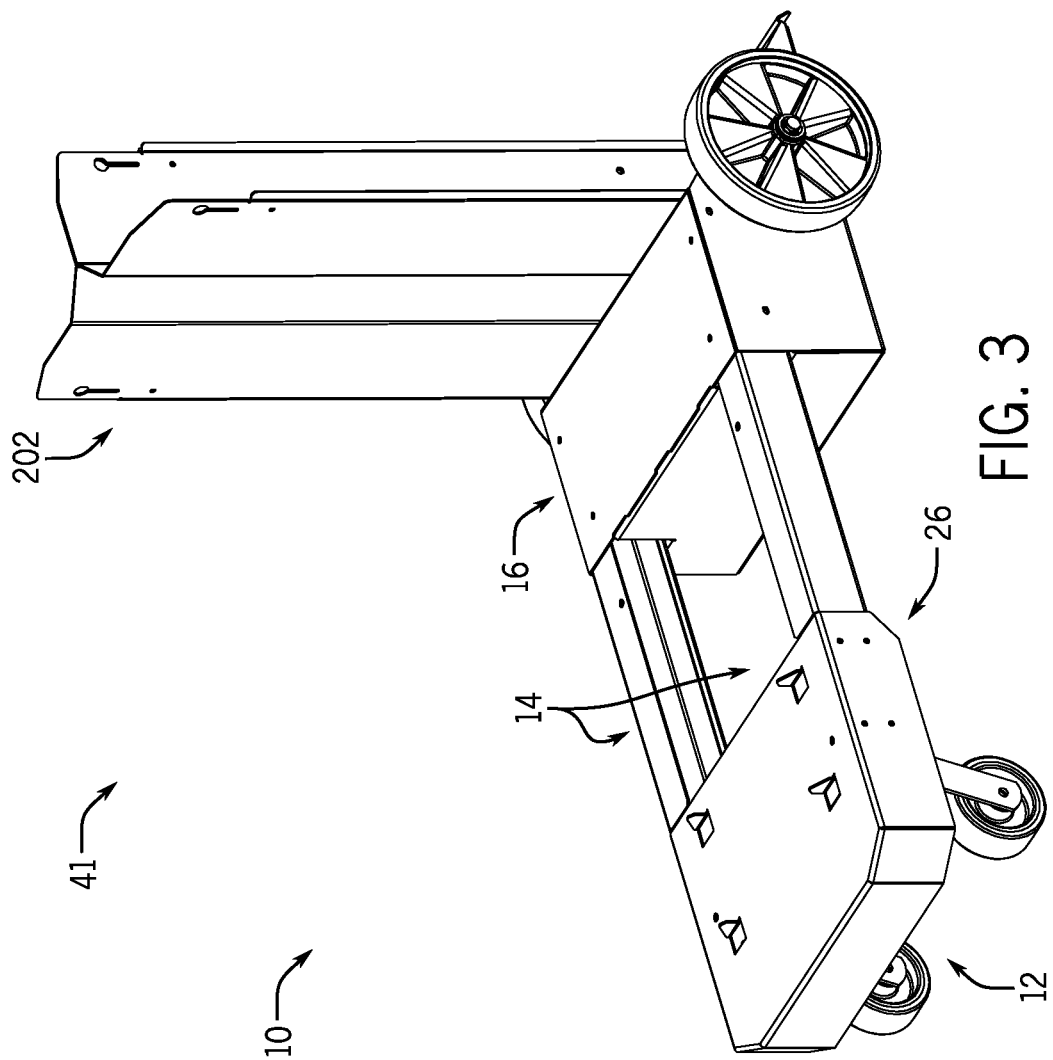
FIG. 3 is a perspective view of the assembled transportation device with the adjustable features arranged into an expanded orientation in accordance with present embodiments.

The rail engagement features 36 are proximate a distal end, indicated as the front end 20, of each of the rails 14. Each of the plurality of rail engagement features 36 is configured to align with one of the engagement features 38 of the front panel 12 to facilitate coupling the rails 14 with the front panel 12 in different configurations. For example, the outermost rail engagement features 36 (i.e., the rail engagement features 36 closest to the distal portion of the front end 20) may be coupled with the engagement features 38 of the front panel in an expanded orientation 40, as shown in FIG. 2. Alternatively, the innermost rail engagement features 36 (i.e., the rail engagement features 36 furthest from the distal portion of the front end 20) may be coupled with the engagement features 38 of the front panel in a compressed orientation 41, as shown in FIG. 3. Indeed, the front panel 12 may be translated along the rails 14 into engagement positions corresponding to the different configurations 40, 41 for transporting welding system components of different sizes. To facilitate this, the rails 14 each include a stepped sidewall 42 including an upper side 44 of the stepped sidewall 42 that includes a first stepped portion 46 and a second stepped portion 48, wherein the second stepped portion 48 extends beyond the first stepped portion 46. As will be discussed below, these stepped portions 46, 48 support rail lips that facilitate alignment and engagement of the rails 14 with the front panel 12. The stepped lips also facilitate provision of an even support surface along with the front panel 12.

Specifically regarding the lips extending from each of the stepped sidewalls 42 of the rails 14, a coupling lip 50 extends from the first stepped portion 46 in a transverse orientation with respect to the stepped sidewall 42, and a support lip 52 extends transversely from the second stepped portion 48. These lip features 50, 52 may coordinate with a support platform 54 of the front panel 12 (e.g., a substantially flat metal plate forming an upper wall of the front panel 12) to facilitate alignment and assembly of system components as well as provide a consistent geometry for support of a welding system component. For example, when assembled, a lower face of the support platform 54 may be positioned flatly against an upper face of the coupling lip 50 to facilitate coupling of the rails 14 to the front panel 12 and to provide structural support of the system 10 by the rails 14. In such an arrangement, the support lip 52 may be aligned with the support platform 54. For example, the support lip 52 and the support platform 54 may essentially share a plane such that a system component can extend along the support platform 54 and the support lip 52 in a level orientation or at a consistent angle. Thus, the support lip 52 is positioned at least partially above the coupling lip 50 in a stepped arrangement. This offset between the coupling lip 50 and support lip 52 may facilitate alignment of the rails 14 and front panel 12.

The lip features 50, 52 also cooperate with the front panel 12 and other features of the rails 14 to facilitate adjustable engagement between modular components of the system 10 to establish different system orientations. As discussed above, each of the plurality of rail engagement features 36 is configured to align with one of the engagement features 38 of the front panel 12 to facilitate coupling the rails 14 with the front panel 12 in different configurations. In a similar and corresponding manner, the coupling lip 50 includes a plurality of welding system engagement features 56 in different locations along a length of the coupling lip 50 proximate the front end 20 of the rails 14. Each of the plurality of system engagement features 56 is configured to align with a welding system engagement feature 58 of the front panel 12 to facilitate coupling the welding system component with the rails 14 and the front panel 12 in different configurations. Like the plurality of rail engagement features 36 and the engagement features 38 of the front panel 12 discussed above, the plurality of system engagement features 56 and welding system engagement features 58 are configured to coordinate to facilitate coupling the rails 14 with the front panel 12 in different configurations. For example, different system engagement features 56 may be aligned with the welding system engagement features 58 depending on a desired configuration of the system (e.g., an expanded orientation 40 or a compressed orientation 41). Indeed, a screw, bolt, or other fastener may pass through both of the aligned engagement features 56, 58, which are openings in the illustrated embodiment, and couple the rails 14 and front panel 12 together. In addition, the engagement features 56, 58 may facilitate coupling with a welding system component (e.g., a power supply or cooler). For example, a bolt may pass through both engagement features 56, 58 and into engagement with an engagement feature of the welding system component.

It should be noted that the illustrated embodiment shows multiple connection features (e.g., rail engagement features 36 and welding system engagement features 56) on the rails that outnumber corresponding connection features of the front panel 12 (e.g., engagement features 38 and welding system engagement features 58). This allows the same connection features of the front panel 12 to connect with different sets of the connection features along the rails 14 to establish different system configurations (e.g., configurations 40 and 41). However, in other embodiments, different numbers and ratios of connection features may be included for the rails 14 and the front panel 12. Indeed, this may provide additional flexibility with respect user-configuration of the system 10. Similarly, it should be noted that other aspects of the system may provide adjustability in a fashion similar to the adjustability of the rails 14 and front panel 12. For example, the wheel assembly 16 and the wheel pan assembly 26 may be adjustable relative to the rails 14 in some embodiments.

The plurality of rail engagement features 36 and the plurality of system engagement features 56 may be oriented with respect to one another to provide a robust coupling between the rails 14 and the front panel 12. For example, the rail engagement features 36 and the system engagement features 56 may be arranged such that they engage the front panel 12 in a transverse manner relative to one another. This may buttress the system 10 with respect to forces applied to the system having different directional components. The specific arrangement of the rail engagement features 36 and the system engagement features 56 are discussed below to provide an example of this relationship.

In the illustrated embodiment, the plurality of rail engagement features 36 are transversely oriented with respect to a face of the stepped sidewall 42 to enable alignment with the engagement features 38 of the front panel 12. Indeed, the illustrated engagement features 38 of the front panel 12 are components of a skirt 62 extending transversely downward from a perimeter of the support platform 54 and substantially parallel with the stepped sidewall 42 to facilitate alignment of the engagement features 38 and rail engagement features 36. A coupling of the engagement features 38 and the rail engagement features 36 includes a coupling along a first direction that is transverse to a face of the skirt 62 and a face of the stepped sidewall 42. Further, the illustrated system engagement features 56 extend through the coupling lip 50 in a orientation transverse to a face of the coupling lip 50 and may be coupled with the welding system engagement features 58 that extend through the support platform 54 in a direction transverse to a face of the support platform 54. Because the face of the support platform 54 and the face of the sidewall 42 are transverse, the associated couplings are also transverse and provide directional buttressing for one another.

Coupling the front panel 12 with the rails 14 may include slidably engaging the front panel 12 with the rails 14. Specifically, the support platform 54 and skirt 62 may cooperate to guide the rails 14 into a proper alignment with the front panel 12. When the front panel 12 is translated with respect to the rails 14 for adjustable engagement with the rails 14, the support platform 54 may be slid over the coupling lip 50 such that a lower face of the support platform 54 flatly abuts an upper face of the coupling lip 50. Also, an inner face of the skirt 62 may be positioned to flatly abut an outer face of the stepped sidewall 42. In combination, these abutments may facilitate guiding the rails 14 with respect to the front panel 12 such that the respective engagement features of each component will line up for coupling. This may facilitate assembly of the related system components. Further, when the lower face of the support platform 54 flatly abuts the upper face of the coupling lip 50, an edge of the support lip 52 may align with an edge of the support platform 54 such that these edges will eventually abut as the front panel 12 slides along the rails 14 from front to back. Thus, the orientation of the support lip 52 relative to the coupling lip 50 and the support platform 54 may function to resist translation of the front panel 12 beyond the rail engagement features 36 and system engagement features 56.

The front panel 12 may be formed of sheet metal. Indeed, the skirt 62 may include various pieces of sheet metal extending transversely from the support platform 54, which may include another piece of sheet metal. The front panel 12 adds multiple levels of functionality to the system 10. For example, the skirt 62 provides a protective barrier for the front wheels 25 and, as discussed above, a guide for engaging the rails 14. Further, the front panel 12 may include self-aligning features 70 to simplify the assembly and/or use of the system 10 when assembled. The self-aligning features 70 may be configured to cooperate with features of the welding system component to align the welding system component with the system engagement features 56, 58. For example, the self-aligning features 70 may fit into one or more openings in a base of the welding-system component. As another example, the self-aligning features 70 may be arranged such that they receive the base. That is, the self-aligning features 70 may define a receptacle in which a base of a welding system feature is fit in a substantially fixed orientation. The self-aligning features 70 may also function as locating features by interlocking, abutting, or otherwise engaging with a platform, base, or other aspect of the welding system component. For example, the tabs may be disposed within recesses in the welding system component. When aligned with the self-aligning features 70, engagement features of the welding system component may correspondingly align with the system engagement features 56, 58 in a particular assembled orientation.

Figure 4:
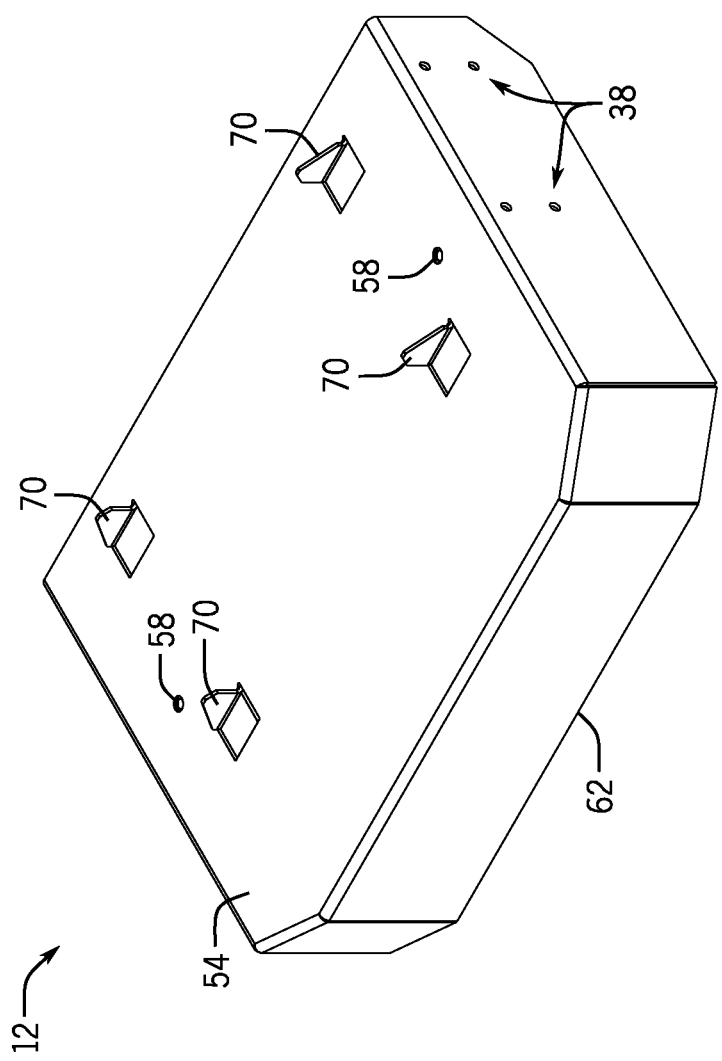
FIG. 4 is a perspective view of a front sheet metal panel including self-aligning features that simplify the assembly of a welding system component to the transportation device in accordance with present embodiments.

In the illustrated embodiment, the self-aligning features 70 include multiple extensions from the front panel 12. These self-aligning features 70 are more readily observable in FIG. 4, which is a perspective view of the front panel 12. The self-aligning features 70 of the illustrated embodiment specifically extent from the support platform 54. However, in other embodiments, the self-aligning features 70 may extend from any portion (e.g., the skirt 62) of the front panel 12. Additionally, as clearly shown in FIG. 4, the self-aligning features 70 include tabs that extend from the support platform and are in a transverse orientation relative to the support platform 54. The tabs in this embodiment are integral with sheet metal forming the support platform 54 and are bent in the transverse orientation. However, in other embodiments, the tabs may be coupled to the support platform or some other aspect of the front panel 12. In some embodiments, the rails 14 may include alignment features as well. Furthermore, certain numbers of the self-aligning features 70 may be employed. For example, between approximately 2 and 20 built-in tabs may be formed on the front panel 12 as the self-aligning features 70.

The wheel assembly 16 may be designed with locating surfaces such that the rails 14 can be easily inserted, self-aligned, and then bolted to the wheel assembly by a user without the use of special tools. In some embodiments, the wheel assembly 16 is not configured to hold a gas cylinder. However, in the embodiments illustrated by FIGS. 1-3, the wheel assembly 16 specifically includes a cylinder pan assembly 80. The cylinder pan assembly 80 includes a housing with sidewalls 82, a clearance panel 84 as an upper wall, a rear wall 86, and a cylinder pan 88. The rails 14 couple to the cylinder pan assembly 80 via rail ports 90 within the cylinder pan assembly 80. These rail ports 90 facilitate alignment of rear engagement features 92 of the rails 14 with engagement features 94 of the cylinder pan assembly 80. Specifically, the rail ports 90 include boundaries defined by borders of the various walls (e.g., the sidewalls 82, the clearance panel 84, and the rear wall 86) of the cylinder pan assembly 80 and these boundaries serve as locating surfaces to align the rails 14 for coupling with the wheel pan assembly 80. In addition to the alignment provided by the rail ports 90, the cylinder pan assembly 80 also provides a built-in offset between a gas cylinder and an installed welding system component via the clearance panel 84 and its relationship to the rail ports 90 and an installed cylinder. This may prevent potential overheating of the gas cylinder bottle when a welding system component is operated while installed on the system 10. Indeed, once the system 10 is assembled, an upper face of the rails 14 (an upper face of the support lip 52) abuts a lower face of the clearance panel 84 and an edge of the clearance panel 84 facing toward the front panel 12 defines a boundary for cooling space between a welding system component (when attached to the system 10) and the at least one gas cylinder bottle (when disposed in the cylinder pan 88). The edge of the clearance panel 84 extends above the support rail 52 and may resist sliding of the welding system component along the rails 14 and further toward the rear of the system 10, wherein the gas bottle would be stored.

Figure 5:
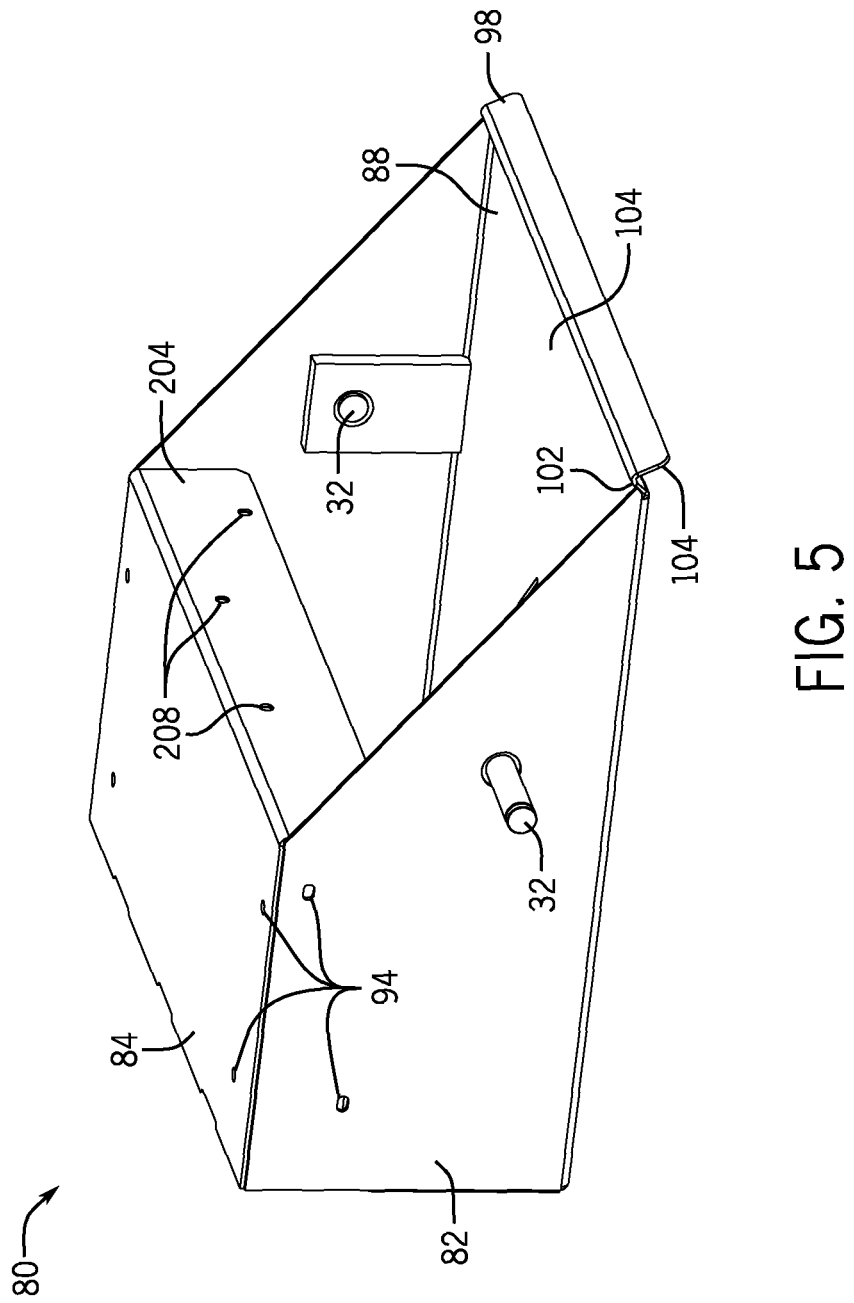
FIG. 5 is perspective view of a cylinder pan assembly depicting an embodiment with a lip extending from a cylinder pan, which helps to load the gas cylinder into the pan in accordance with present embodiments.

The cylinder pan 88, which may include a planar support for a gas cylinder bottle, functions as a base wall of the cylinder pan assembly 80. The cylinder pan 88 may enable the operator of the transportation device or system 10 to load the gas cylinder bottles into the transportation device 10. The cylinder pan 88 is designed to hold and support various sizes and geometries of gas cylinder bottles. The cylinder pan 88 may be coupled (e.g., welded or via fasteners) with the sidewalls 82 and/or the rear wall 86. Specifically, the cylinder pan 82 is configured to cooperate with other aspects of the cylinder pan assembly 80 to support a gas cylinder positioned thereon. As best illustrated in FIG. 5, which is a perspective view of the cylinder pan assembly 80 without the wheels 30 coupled to the axles 32, the cylinder pan 88 includes a lip 98 on an edge of the cylinder pan 88 for facilitating loading of at least one gas cylinder bottle. The lip 98 may simplify this loading process by enabling a smooth transition into the cylinder pan 88 from another surface (e.g., floor, shelf). Certain characteristics of the lip 98 make it particularly configured to serve the purpose of loading and retaining the gas bottle. Indeed, the lip 98 includes a sinusoidal shape, which is understood to be generally sinusoidal. Specifically, the lip 98 includes a peak 102 that extends above an upper face 104 of the cylinder pan 88 and a ramp 104 that extends below the upper face 104. Thus, the lip 98 provides a slope for a gas cylinder bottle to roll over and into the cylinder pan 88 while also providing a barrier that, once within the cylinder pan 88, the gas cylinder bottle must roll over to exit the cylinder pan 88.

Further, as illustrated in FIGS. 1-3, the cylinder pan assembly 80 may include at least one cylinder support 202 extending from the cylinder pan assembly 80 in a direction transverse to the cylinder pan 88. The cylinder supports 202 are configured to rest on the cylinder pan 88. Further, as partially illustrated by viewing FIGS. 1-3 and 5 together, the cylinder supports 202 are configured to couple with a lip 204 of the clearance panel 84 via cylinder support attachment features 206 and corresponding attachment features 208 of the cylinder pan assembly 80. In other embodiments, different coupling arrangements may be employed. An operator may use the lip 98 to guide the gas cylinder bottle into the cylinder pan 88 until it contacts one of the gas cylinder supports 202, and the operator may then secure the gas cylinder bottle to the gas cylinder support 202. The cylinder pan 88 and cylinder support 202 may cooperate to accommodate multiple different gas cylinder bottle geometries.

In the illustrated embodiment, there are two cylinder supports 202 that each includes a three-sided panel. The three-sided panels have generally C-shaped cross sections that, when installed in the system 10, are angled back and away from a centerline of the system 10 to facilitate receiving gas cylinder bottles within the cylinder supports 202. In particular, as illustrated, a panel 212 of a first three-sided panel 214 is aligned with and placed flatly against a panel 216 of a second three-sided panel 218 to establish triskelion arrangement of the two three-sided panels 216, 218. That is, a cross-section of the two cylinder supports 202 would appear similar to a triskelion. It should be noted that the use of multiple panels provides a plurality of surfaces for the gas cylinder bottles to abut, which provides support of the bottles in multiple directions. The panels may also be configured to receive multiple different sizes of bottles. Indeed, in some embodiments, the arrangement of the panels may be adjustable to accommodate different types of bottles. Indeed, the cylinder supports 202 may be physically wrapped around bottles. Additional support for the gas cylinder bottles may be provided by cylinder support lips 222 or a cord (e.g., chain, rope, wire, cable) extending between receptacles 224 in the edges of the cylinder supports 202.

Figure 6:
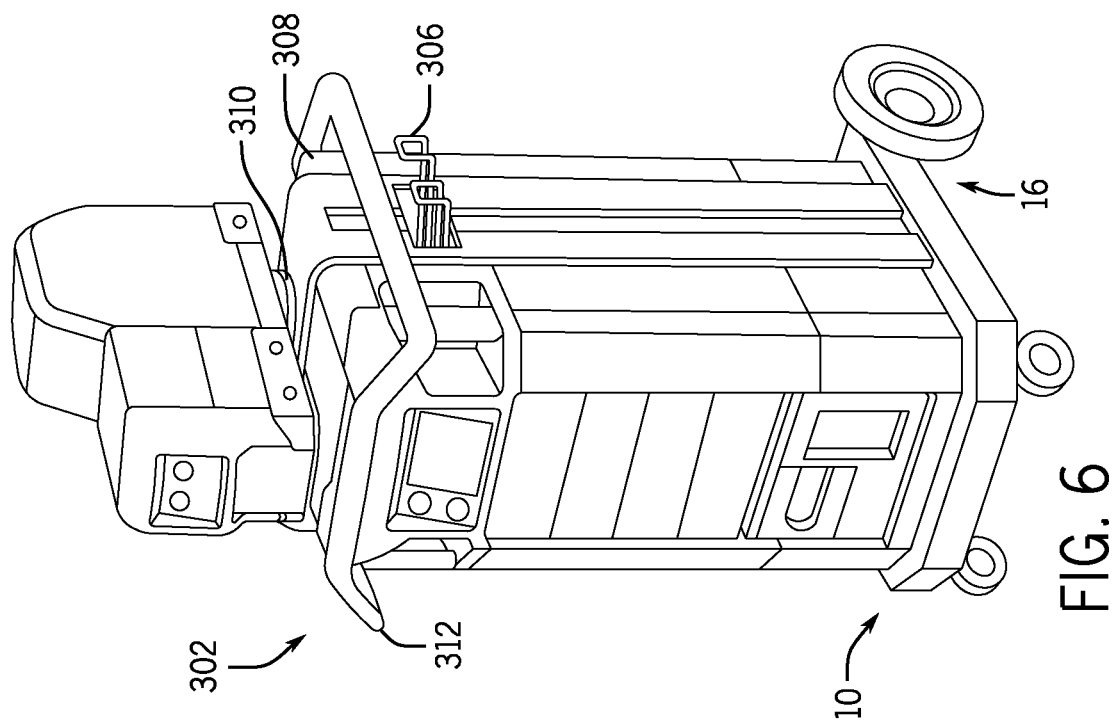
FIG. 6 is a perspective view of an assembled transportation device with a welding system coupled thereto in accordance with present embodiments.

FIG. 6 illustrates a system 10 with a welding system 302 installed thereon in accordance with present embodiments. As illustrated in by the embodiment presented in FIG. 6, in certain embodiments, the wheel assembly 16 does not include the cylinder pan assembly 80. Excluding features related to the cylinder pan assembly 80 may enhance mobility of the transportation device or system 10 in situations where the user does not need gas cylinders to accompany the welding system being transported. In addition, other aspects of modularity of the transportation device 10 may be included. For example, in certain embodiments, the transportation device 10 may include a cable hanger 306 for hanging cables, feeder support 308 and swivel 310 for maneuvering a wire feeder, PC & LED/LCD support stand 312, and other modular components that can be utilized to accessorize the system 10.

Present embodiments may include a method of assembling a modular welding component transportation system. Specifically, the method may include receiving a first end of a pair of rails into a front panel such that upper walls of the pair of rails abut a support platform of the front panel and side walls of the pair of rails abut different portions of a panel skirt of the front panel. The method may further include aligning engagement features of the front panel with at least two of a plurality of engagement features of each of the pair of rails to define a compressed or expanded orientation of the transportation system depending on which of the plurality of engagement features of each of the pair of rails is aligned with the engagement features of the front panel. Additionally, the method may include receiving a second end of the pair of rails into a cylinder pan assembly such that the upper walls of the pair of rails abut an upper panel of the cylinder pan assembly and side walls of the pair of rails abut different side panels of the cylinder pan assembly, the cylinder pan assembly comprising a cylinder pan with a ramped lip extending from an edge of the cylinder pan in a direction opposite the pair of rails and a cylinder support extending transverse the cylinder pan. The method may also include aligning a welding system component with alignment features of the front panel for attachment to the front panel, and maintaining an offset distance between the welding system component and the cylinder support with a clearance panel of the cylinder pan assembly.

Present embodiments may provide welding system transportation device that is easy to assemble on-site by a user with no special tools required. Assembly may be facilitated by use of similar engagement features throughout, employing alignment guides, and the provision of modular features. Using identical (e.g., standardized) parts as assembly components and modular features may facilitate keeping manufacturing inventory low and saving associated costs. Modular characteristics of the system also facilitate packaging and shipping. Further, the module aspects of the system may reduce non-value added manual efforts in orienting parts while assembling.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations.

The invention claimed is:

1. A modular welding component transportation system, comprising:
    a front panel comprising a support platform configured to support a welding system component;
    a wheel assembly comprising a first plurality of wheels;
    a rail configured to adjustably couple with the front panel proximate a first end of the rail and configured to couple with the wheel assembly proximate a second end of the rail;
    locating surfaces of the wheel assembly configured to receive and align the rail for engagement with walls of the wheel assembly; and
    a second plurality of wheels configured to be coupled with the front panel or proximate the first end of the rail.

2. The system of claim 1, comprising a plurality of rail engagement features in different locations along a length of the rail and proximate a distal end of the rail, each of the plurality of rail engagement features configured to align with an engagement feature of the front panel to facilitate coupling the rail with the front panel in different configurations.

3. The system of claim 1, wherein the front panel comprises alignment features configured to facilitate alignment of the welding system component with the support platform by engaging with a base of the welding system component.

4. The system of claim 3, wherein the alignment features comprise tabs that extend from the support platform and are in a transverse orientation relative to the support platform.

5. The system of claim 4, wherein the tabs are integral with sheet metal forming the support platform and are bent in the transverse orientation.

6. The system of claim 3, comprising the welding system component including the base, wherein the alignment features of the front panel are engaged with the base of the welding system component such that coupling features of the welding system component align with welding system engagement features of the support platform or the rail.

7. The system of claim 1, wherein the front panel comprises a skirt extending along the perimeter of the support platform and transverse to the support platform, the skirt configured to facilitate alignment of the rail for coupling with the front panel.

8. The system of claim 1, wherein the rail comprises a stepped sidewall comprising an upper side of the stepped sidewall that includes a first stepped portion and a second stepped portion, the second stepped portion extending beyond the first stepped portion.

9. The system of claim 8, comprising a coupling lip extending from the first stepped portion and transverse to the stepped sidewall.

10. The system of claim 9, wherein the coupling lip comprises a plurality of welding system engagement features in different locations along a length of the coupling lip proximate the distal end of the rail, each of the plurality of system engagement features configured to align with a welding system engagement feature of the support platform to facilitate coupling the welding system component with the rail and support platform in different configurations.

11. The system of claim 9, comprising a support lip extending transversely from the second stepped portion, wherein an edge of the support lip aligns with an edge of the support platform when an upper face of the coupling lip is adjacent a lower face of the support platform.

12. The system of claim 1, wherein the wheel assembly comprises a cylinder pan assembly with a planar support for a gas cylinder bottle.

13. The system of claim 1, comprising a plurality of rails configured to adjustably couple with the front panel proximate a first end of the plurality of rails and configured to couple with the wheel assembly proximate a second end of the plurality of rails.

14. A welding system transportation system, comprising:
    a front panel comprising a support platform configured to support a welding system component;
    a cylinder pan assembly comprising a plurality of back wheels and a cylinder pan configured to support at least one gas cylinder bottle;
    a rail adjustably coupled with the front panel proximate a first end of the rail and coupled along guideways of the cylinder pan proximate a second end of the rail; and
    a plurality of front wheels configured to be coupled with the front panel or proximate the first end of the rail.

15. The system of claim 14, wherein the cylinder pan comprises a lip on an edge of the cylinder pan for facilitating loading of the at least one gas cylinder bottle, wherein the cylinder pan forms a base between two sidewalls of the cylinder pan assembly.

16. The system of claim 15, wherein the lip comprises a sinusoidal shape with a peak that extends above an upper face of the cylinder pan.

17. The system of claim 14, comprising a cylinder support extending from the cylinder pan assembly in a direction transverse to the cylinder pan, the cylinder support including at least one three-sided panel.

18. The system of claim 17, wherein the cylinder support comprises first and second three-sided panels, wherein a panel of the first three-sided panel is aligned with and placed flatly against a panel of the second three-sided panel to establish triskelion arrangement of the panels of the first and second three-sided panels.

19. The system of claim 14, wherein the cylinder pan assembly comprises a clearance panel as an upper wall of the cylinder pan assembly, wherein the rail couples to the cylinder pan assembly such that an upper face of the rail abuts a lower face of the clearance panel and such that an edge of the clearance panel facing toward the front panel defines a boundary for cooling space between a welding system component when attached and the at least one gas cylinder bottle when disposed in the cylinder pan.

20. A method of assembling a modular welding component transportation system, comprising:
    receiving a first end of a pair of rails into a front panel such that upper walls of the pair of rails abut a support platform of the front panel and side walls of the pair of rails abut different portions of a panel skirt of the front panel;

aligning engagement features of the front panel with at least two of a plurality of engagement features of each of the pair of rails to define a compressed or expanded orientation of the transportation system depending on which of the plurality of engagement features of each of the pair of rails is aligned with the engagement features of the front panel;

receiving a second end of the pair of rails into a cylinder pan assembly such that the upper walls of the pair of rails abut an upper panel of the cylinder pan assembly and side walls of the pair of rails abut different side panels of the cylinder pan assembly, the cylinder pan assembly comprising a cylinder pan with a ramped lip extending from an edge of the cylinder pan in a direction opposite the pair of rails and a cylinder support extending transverse the cylinder pan;

aligning a welding system component with alignment features of the front panel for attachment to the front panel; and maintaining an offset distance between the welding system component and the cylinder support with a clearance panel of the cylinder pan assembly.

* * * * *